United States Patent [19]
Reuter et al.

[11] Patent Number: 5,715,674
[45] Date of Patent: Feb. 10, 1998

[54] HYDROMECHANICAL CONTROL FOR A VARIABLE DELIVERY, POSITIVE DISPLACEMENT FUEL PUMP

[75] Inventors: Charles E. Reuter, Granby, Conn.; Timothy J. Gaudet, Southampton, Mass.

[73] Assignee: United Technologies Corporation, Hartford, Conn.

[21] Appl. No.: 577,776

[22] Filed: Dec. 22, 1995

[51] Int. Cl.[6] ............................................. F02C 9/28
[52] U.S. Cl. ............................................ 60/39.281
[58] Field of Search .......................... 60/39.281, 734

[56] References Cited

U.S. PATENT DOCUMENTS

| | | |
|---|---|---|
| 2,628,472 | 2/1953 | Dray et al. . |
| 3,020,890 | 2/1962 | Grad . |
| 3,413,806 | 12/1968 | Belke et al. . |
| 3,596,467 | 8/1971 | Avery . |
| 3,618,315 | 11/1971 | Avery . |
| 3,704,588 | 12/1972 | Trabbic . |
| 3,898,795 | 8/1975 | Barker . |
| 3,991,569 | 11/1976 | Smith . |
| 4,875,168 | 10/1989 | Martin . |
| 4,920,942 | 5/1990 | Fujimori et al. . |
| 4,958,494 | 9/1990 | Maki et al. . |
| 4,993,391 | 2/1991 | Kuribara et al. . |
| 5,133,181 | 7/1992 | Moore, Jr. . |

FOREIGN PATENT DOCUMENTS

| | | |
|---|---|---|
| 2389000 | 4/1977 | France . |
| 702410 | 1/1954 | United Kingdom . |

*Primary Examiner*—Louis J. Casaregola
*Attorney, Agent, or Firm*—Richard H. Kosakowski, Esq.; Holland & Bonzagni, P.C.

[57] ABSTRACT

A hydromechanical control system for a variable delivery, positive displacement fuel pump includes a variable area orifice metering window through which fuel from the pump outlet passes on its way to a gas turbine aircraft engine. The fuel pressures on either side of the fuel metering window are ported to corresponding sides of a spool of a pump control valve. The position of the valve spool controls the fuel flow to either side of a pump control actuator, whose movement varies the displacement of the pump. A bypass fuel flow upstream of the fuel metering valve is also ported to the pump control valve. During steady-state pump operation, a relatively small and constant value of fuel flow is bypassed through the pump control valve and back to the pump inlet. However, upon increasing or decreasing pump speed transients, the bypass fuel flow is increased or decreased in a proportional amount. In this way, improved control of the pump during transient conditions is achieved.

12 Claims, 3 Drawing Sheets

HYDROMECHANICAL CONTROL FOR A VARIABLE DELIVERY, POSITIVE DISPLACEMENT FUEL PUMP

BACKGROUND OF THE INVENTION

This invention relates to the control of a fuel pump, and more particularly to a hydromechanical control for a variable delivery, positive displacement fuel pump for a jet aircraft gas turbine engine.

Fuel pumps for aircraft gas turbine engines have traditionally been fixed delivery, positive displacement type pumps. This type of pump delivers a constant volume of fuel for each cycle of pump operation. Further, this type of pump is normally driven at a fixed delivery ratio relative to engine speed. The critical pump sizing criteria are typically the fuel flow and pressure needed for engine lightoff at cranking speeds (approximately 10 percent of full speed).

However, these pump sizing criteria result in excessive fuel delivery at higher engine speeds and altitudes (i.e., for most of normal engine operation). As a result, actual pump delivery flow in excess of desired or required engine flow is typically bypassed back to the pump inlet. A major problem with this result is that bypass and recirculation of fuel results in significant fuel heating due to the pressurizing of the fuel by the pump and the subsequent pressure drop of the fuel in the bypass line upstream of the pump. The high fuel temperature is also a problem since the fuel is typically used as a heat exchange medium in the engine.

With the latest fuel efficient engine designs, excessive fuel heating becomes a serious problem. Reduced engine fuel consumption is accompanied by increased engine and oil lubrication system temperatures. Excess oil lubrication system heat is normally managed with a combination of fuel/oil and air/oil heat exchangers.

However, heat exchangers are undesirable in this situation because of their associated size, weight and cost. Air/oil coolers are problematic because of the drag penalty they incur on the aircraft. Yet, the cooling burden on an air/oil cooler is decreased with lower fuel temperatures. This is because the lower fuel temperatures permit more lubrication system heat to be directed to the fuel system through the fuel/oil heat exchanger. This can result in a significant reduction in heat exchanger system size, weight and cost, as well as a reduction in the drag penalties associated with the air/oil coolers.

In contrast to fixed delivery pumps, variable delivery, positive displacement fuel pumps have the ability to vary delivery flow, to thereby match engine demands for a wide range of engine speeds and altitudes. Thus, the variable delivery pump eliminates the excessive fuel delivery and resulting heat generation inherent in fixed delivery pumps.

To take full advantage of the variable delivery capabilities of this type of pump, a pump control system is normally required. Further, to be an effective control system, accurate, uninterrupted scheduling of fuel flow to the engine is necessary at all engine operating conditions. These operating conditions typically include rapid and sudden disturbances in pump fuel flow, including those caused by the slewing of fuel powered engine actuators.

One known prior art method of pump flow control is to position a variable area orifice (i.e., a metering window) in the pump flow path. A constant pressure drop is maintained across the metering window by varying pump displacement. This constant pressure drop across the metering window insures that the correct scheduled fuel flow is supplied to the engine.

In this type of control scheme, pump displacement is typically altered by an actuator driven by a pilot valve. The spring biased pilot valve senses pressure both upstream and downstream of the metering window. As pump flow conditions change, a different metering valve pressure drop is sensed by the pilot valve. In response, the pilot valve translates and moves the pilot valve windows from their null position. This causes the pump actuator to stroke, thereby varying pump displacement until the desired and constant metering valve pressure drop is restored.

However, a problem with this pressure drop control scheme is its inability to quickly and adequately respond to sudden disturbances in flow. This scheme usually does not provide for a fast responding proportional control of fuel flow. The bandwidth of this pressure drop control is limited by the dynamic response of the pump actuator servo system. If the servo system response could be improved, the control system bandwidth could increase. However, the increase in control system bandwidth is limited by the requirements for control stability at all operating conditions.

A second inherent drawback in the pressure drop control scheme is its sensitivity to pump servo friction. A pump control actuator inherently has a relatively large amount of friction. Friction causes a flow scheduling deadband which can lead to inaccuracies and instability.

In the alternative, flow control for a variable displacement, fixed delivery pump may be carried out electronically with a microprocessor. The microprocessor detects pump fuel flow to the engine via a flow sensor located in the engine fuel flow delivery line. The microprocessor software compares actual flow with desired flow and, upon any difference therebetween, the microprocessor varies pump displacement by positioning a pump servo system via an electromechanical interface device (such as an electrohydraulic servo valve) until commanded flow matches delivered flow.

A benefit of the flow sensor and microprocessor approach is that a variable or fixed metering window with a fixed regulated pressure drop is not required. Elimination of this pressure drop across the metering window reduces the total system pressure drop. This reduces the maximum working pressures at maximum fuel flow conditions, as well as reduces required pump head at starting conditions. In addition, control gains as well as engine flow schedules can be easily altered electronically through software, rather than by a hardware implementation.

However, meeting control system dynamic response requirements can be a problem with the above described electronic control approach. For example, the bandwidth of the system is limited by digital sampling delays. To achieve the necessary bandwidth, very fast digital sampling rates are required. While fast sampling rates can be achieved, the result is a marked increase in microprocessor cost and complexity. In addition, the electronic control scheme exhibits the same sensitivity to pump servo friction as the pressure drop regulation scheme. Thus, the prior art electronic control schemes are approximately similar to the prior art pressure drop control schemes in their inability to adequately respond to sudden disturbances in the flow.

Accordingly, it is a primary object of the present invention to provide a hydromechanical control system for a variable delivery, positive displacement fuel pump.

It is a general object of the present invention to provide the hydromechanical control system that achieves quick, accurate and uninterrupted dynamic response to external flow disturbances.

It is another object of the present invention to provide the hydromechanical control system that exhibits relatively reduced sensitivity to pump servo friction.

It is still another object of the present invention to provide the hydromechanical control system that utilizes a bypass flow line, but with significantly less heat generation compared to a prior art bypass line for a fixed delivery, positive displacement fuel pump.

It is yet another object of the present invention to provide the hydromechanical control system that provides for a controlled proportional bypass flow.

It is still another object of the present invention to provide the hydromechanical control system that closely schedules pump fuel flow to match engine flow demand at all engine operating conditions.

It is another object of the present invention to provide the hydromechanical control system that provides for improved transient response and steady-state accuracy through use of a controlled fuel bypass loop from the pump outlet back to the pump inlet.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the applicants have invented a hydromechanical control system for a variable delivery, positive displacement fuel pump for a jet aircraft gas turbine engine.

In a preferred embodiment, fuel flow output from the pump enters a fuel metering unit and initially encounters a metering valve. The metering valve positions a variable area orifice (i.e., a contoured metering window) in the main fuel flow path from the pump to the jet engine. The actual position of the metering valve is sensed by a linear variable displacement transformer (LVDT), and a position signal is fed to an electronic engine control. The electronic engine control generates a desired metering valve position signal based on a number of engine and aircraft parameters, and feeds this signal to a torque motor which controls the position of the contoured metering window.

The fuel pressure at the upstream and downstream positions across the metering window is fed to the corresponding ends of a spool of a pump control valve. The pump control valve ultimately maintains a constant pressure drop across the metering window by simultaneously varying the displacement of the pump through the pump control actuator and the amount of fuel bypassed from the pump outlet back to the pump inlet. Holding metering valve pressure drop to a constant value results in fuel flow scheduling as a function of metering valve position.

One side of the spool of the pump control valve is ported to the pressure of the pump outlet fuel flow upstream of the metering window. The opposite side of the pump control valve spool is ported to the pressure of the pump outlet fuel flow downstream of the metering window. The spring load on the pressure control valve spool equals the difference of the spool pressures multiplied by the piston area. As the metering valve window area changes due to, e.g., external changes to pump flow demand, the pump control valve senses the changed pressure drop across the metering valve window and moves to bypass more or less of pump output through the pump control valve, ultimately holding the desired pressure drop value constant across the metering valve. Also, the pump control valve spool moves, together with the pump control valve pilot valve orifices or windows, in a direction off of their null position. These windows ultimately control the displacement and the delivery of the pump by porting high pressure hydraulic fluid to one side of the pump control actuator, and low pressure hydraulic fluid to the opposite side of the pump control actuator. This causes a force imbalance on the pump actuator and the actuator moves in a direction to either increase or decrease pump displacement and flow. When pump displacement has been altered sufficiently to restore the desired pressure drop across the metering valve, the pump control valve pilot valve windows are returned to their null position and the pump actuator stops slewing and the overall system assumes steady-state position. In this position, the bypass flow from the pump outlet through the pump control valve and back to the pump inlet is a constant and relatively small value as compared to the amount of bypass flow occurring in the aforementioned prior art fixed delivery, positive displacement pump. The steady-state bypass flow through the pump control valve is only that amount required to obtain the desired steady-state accuracy and transient response of the overall hydromechanical control system. Also, variations in the amount of bypass flow for various steady-state operating conditions are small, since bypass flow varies only as a function of pump discharge pressure.

DETAILED DESCRIPTION OF THE PREFERRED EMBODIMENTS

Figure 1:
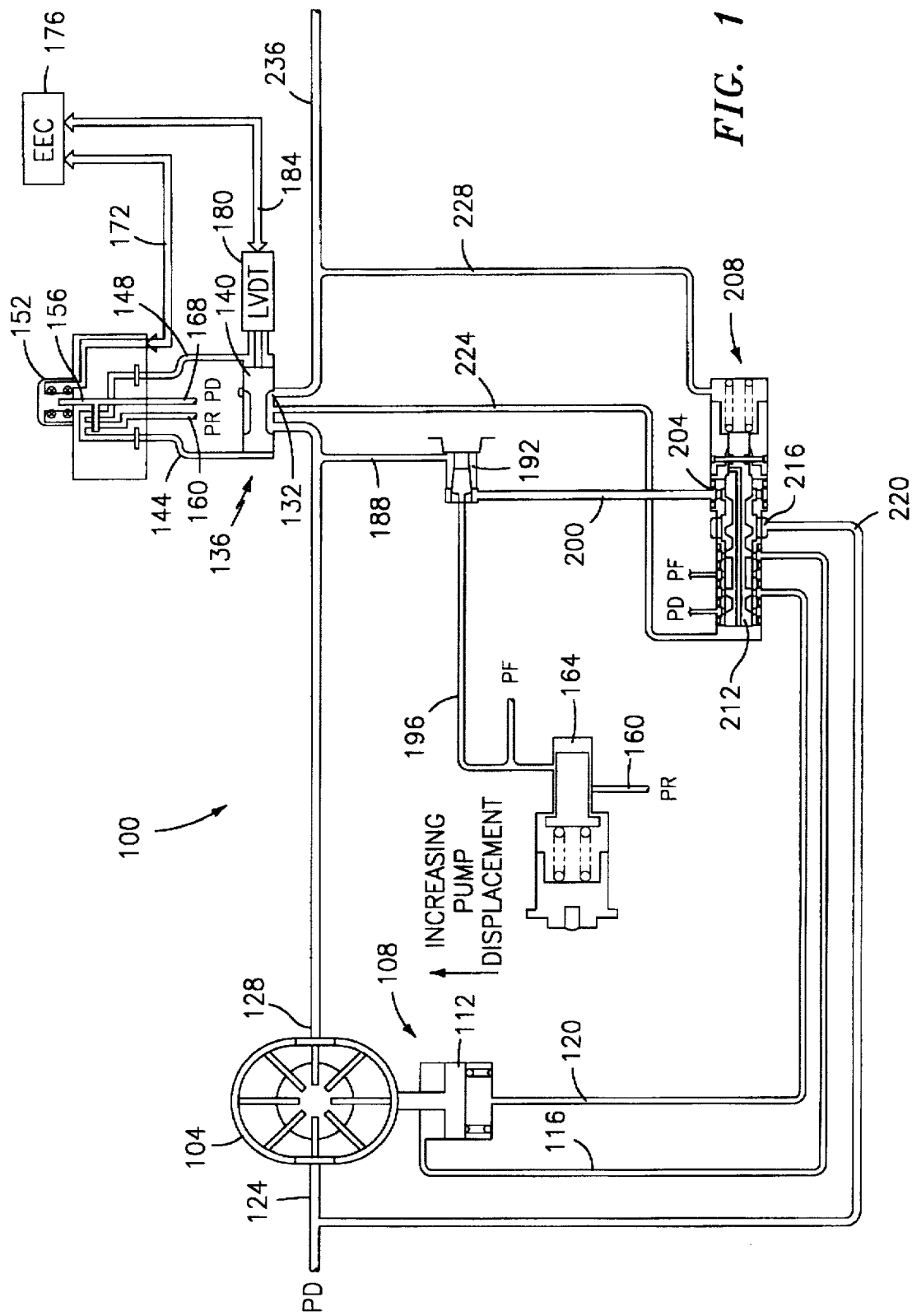
FIG. 1 is a schematic view of a variable delivery, positive displacement fuel pump together with a hydromechanical control system in accordance with the present invention.

Referring to the drawings in detail, there illustrated is a control system 100 for a variable delivery, positive displacement pump 104 used to provide fuel for a jet aircraft engine (not shown). Associated with the pump 104 is a pump control actuator 108 that comprises a spring-loaded, moveable element or piston 112 that has hydraulic fluids of predetermined pressures placed onto either side of the piston 112. The fluids are provided in corresponding hydraulic lines 116, 120 from the control system 100. Further associated with the pump 104 is a hydraulic line at the pump inlet 124. This inlet 124 may be connected to a source of fuel (not shown). The pump 104 also has an outlet 128 connected with the corresponding hydraulic line that carries fuel from the pump outlet 128 to the control system 100. The pump 104 and its associated control actuator 108 are commercially available. For usage with a jet aircraft engine, the variable delivery pump may be required to pump fuel in the range of between two hundred and thirty-five thousand pounds per hour; that is, over a wide flow range of 175 to 1.

The fuel flow from the pump outlet 128 is connected with a contoured metering window 132 that is a part of a metering valve 136. The metering valve 136 may be considered part of a fuel metering unit. The metering window 132 is formed in a spool 140 of the metering valve 136. In a preferred embodiment, the metering valve spool 140 is moveable linearly depending upon pressures of hydraulic fluids within hydraulic lines 144, 148 applied to each end of the spool 140. The hydraulic fluid pressure in the lines 144, 148 may typically be as required to maintain the metering valve in force balance. The pressures in lines 144,148 are based on the pressures, $P_R$ and $P_D$, and the position of the pilot valve 156 which is controlled by a torque motor 152. The fluid pressure $P_R$ may be provided on the line 160 from a servo pressure regulator valve 164. On the other hand, the hydraulic line $P_D$ 168 may be of a relatively lower pressure, and, for example, may be connected directly to the pump inlet 124.

The torque motor 152 controls the displacement of its associated pilot valve 156 to thereby control the application of the fluids in the lines 144, 148 to each end of the spool 140 of the metering valve 136. The torque motor 152 is controlled by electrical signals on signal lines 172 provided by an electronic engine control 176 ("EEC"). The linear position of the spool 140 of the metering valve 136 is monitored by a linear variable displacement transformer 180 ("LVDT"), which is connected to the EEC 176 by corresponding signal lines 184.

The hydraulic line from the pump outlet 128 upstream of the metering window 132 is connected with the first portion of a bypass hydraulic line 188. This hydraulic line 188 is connected to a wash filter 192 which provides fine filtered fuel, $P_F$, in a hydraulic line 196 to the input of the servo pressure regulator valve 164. Operation of the wash filter 192 is described in greater detail hereinafter.

Figure 2:
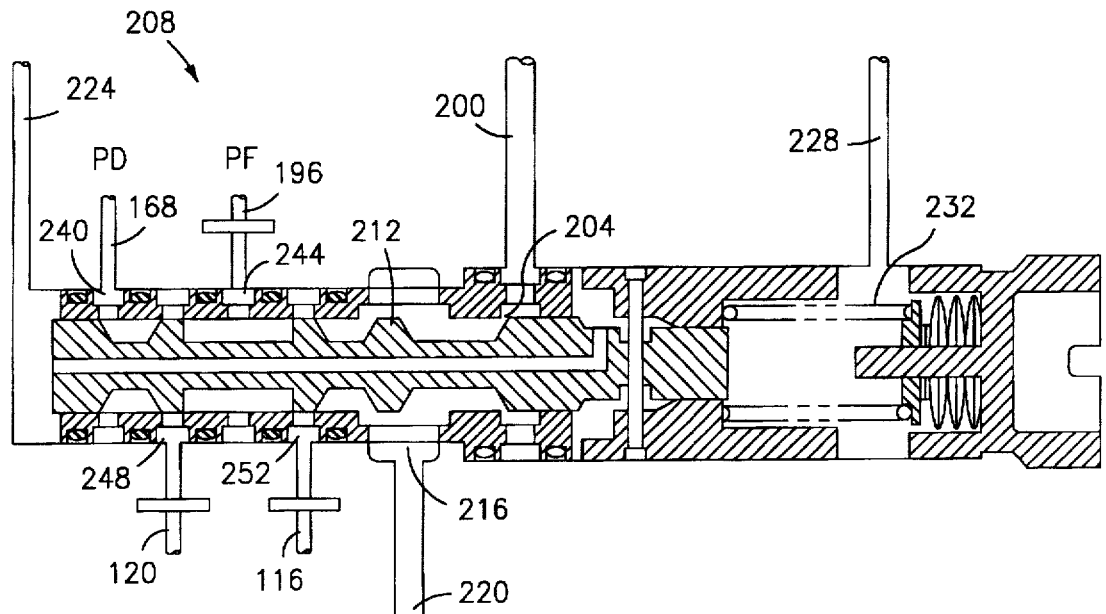
FIG. 2 is a cross sectional view of a pump control valve that is a part of the hydromechanical control system of FIG. 1, with the pump control valve being shown in a steady-state condition.
Figure 3:
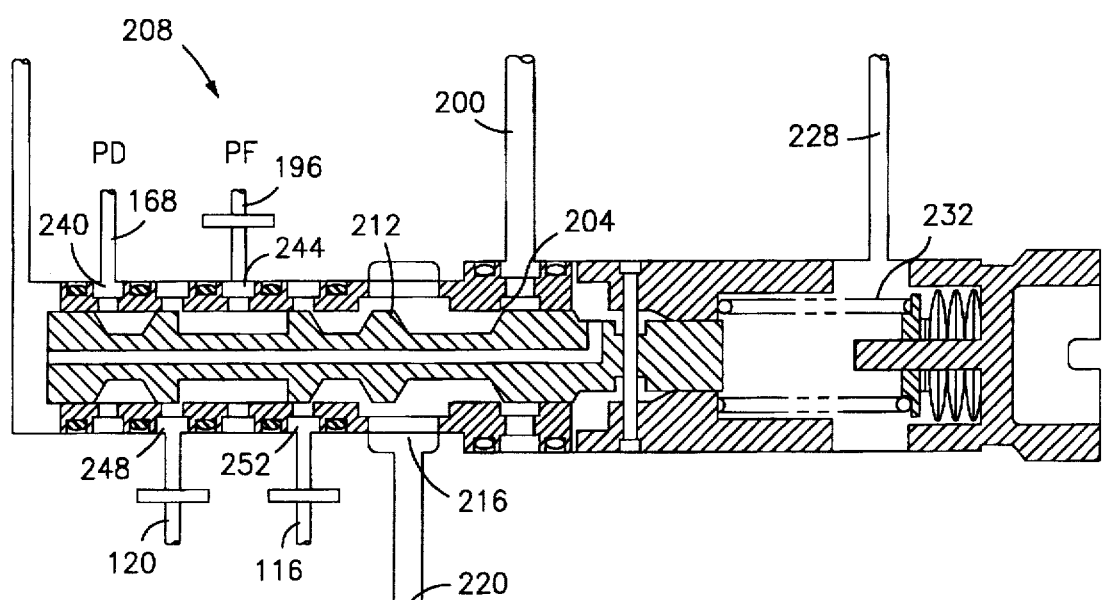
FIG. 3 is a cross sectional view of the pump control valve of FIG. 2 shown in an increasing transient condition.
Figure 4:
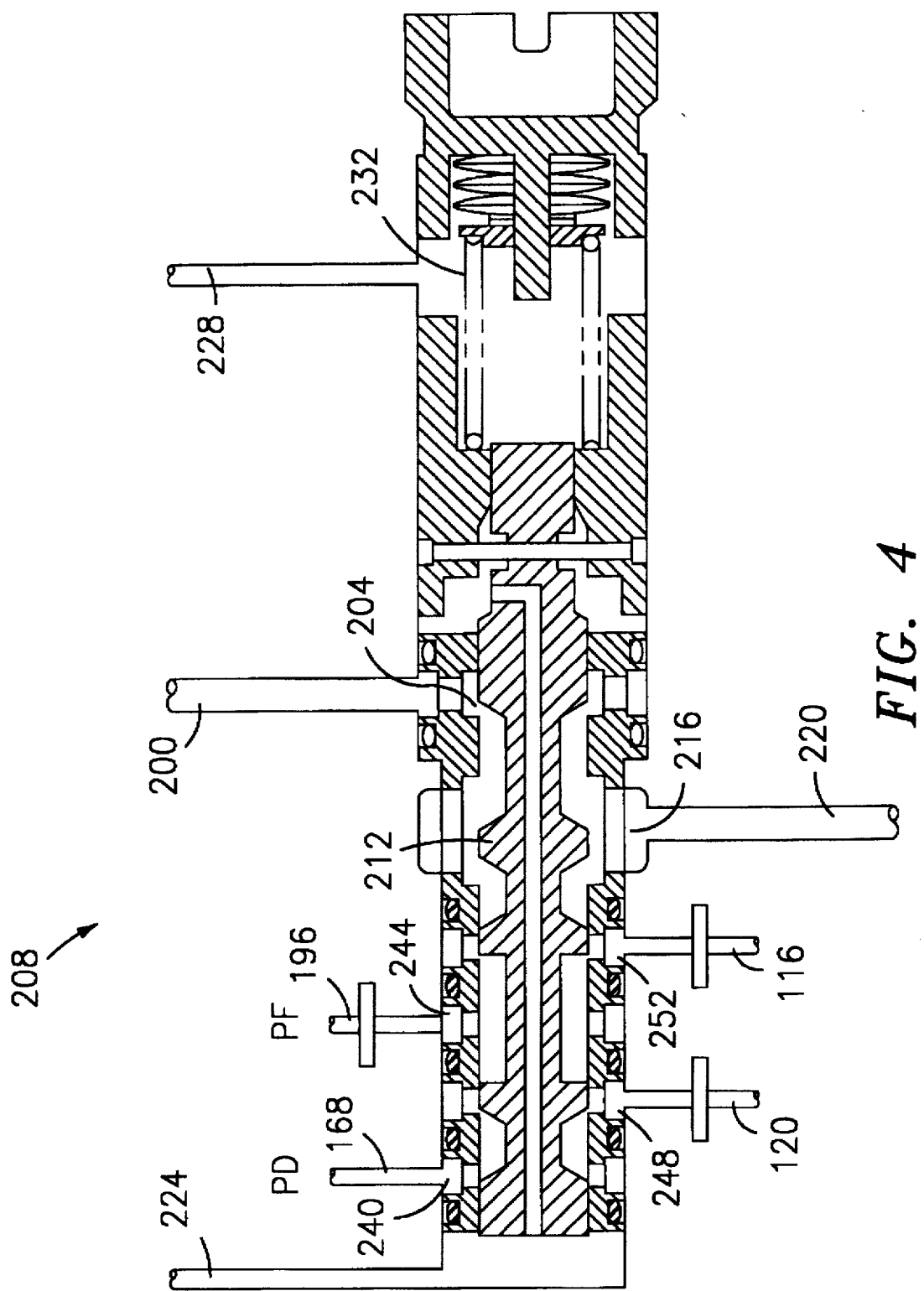
FIG. 4 is a cross sectional view of the pump control valve of FIGS. 2 and 3 shown in a decreasing transient condition.

The output of the wash filter 192 on a hydraulic line 200 comprises a further continuance of the bypass line and is fed to an input orifice or a window 204 of a pump control valve 208, shown in greater detail in FIGS. 2–4. The pump control valve 208 contains a linearly-moveable spool 212, whose position controls the amount of opening of the window 204. This, in turn, controls the amount of bypass fuel in the bypass line 188, 200 that flows through the pump control valve to an output orifice 216 and into a hydraulic line 220 connected back to the pump inlet 124. In accordance with the present invention, during steady-state conditions the pump control valve 208 is operable to allow a relatively small and constant amount of fuel to be bypassed from the pump outlet 128 along the bypass lines 188, 200 through the pump control valve 208 and back to the pump inlet 124 along the hydraulic line 220. However, during transient conditions, the pump control valve 208 is operable to allow either more or less hydraulic fluid to be bypassed back to the pump inlet 124, as will be discussed in detail hereinafter with respect to FIGS. 3 and 4. For the purposes of this invention, a transient condition is defined to be any externally-caused change to pump flow, either due to a change in metered flow, or a change in servo flow.

The linear position of the spool 212 of the pump control valve 208 is controlled by the pressure of the corresponding fuel provided on the lines 224, 228 to either side of the spool 212. The right side of the spool 212 is biased towards the left by a spring 232. The left side of the spool 212 has fuel applied thereto that is at approximately the same pressure as that at the pump outlet 128. Conversely, the right side of the spool has fuel applied thereto that is at a relatively lower pressure than that of the pump outlet 128. This is because the right side of the spool is connected by the hydraulic line 228 to the downstream pressure side of the metering valve 136. The metering valve 136 causes a pressure drop across the metering window 132 of the fuel flowing from the pump outlet 128 and on the line 236 to the engine (not shown).

The spool 212 of the pump control valve 208 also contains additional input windows or orifices 240, 244 that are connected to the corresponding pressure drain, $P_D$, and fine filtered fuel, $P_F$, lines 168, 196 respectively. The pump control valve 208 has corresponding output orifices or windows 248, 252 that are connected with the hydraulic lines 120, 116, respectively, back to either side of the piston 112 of the pump control actuator 108. The linear position of the spool 212 of the pump control valve 208 controls the application of the hydraulic fluid pressure to the pump control actuator 108, as described in detail hereinafter.

Referring also to FIG. 2, there illustrated is a steady-state position of the spool 212 of the pump control valve 208. In this steady-state condition, the piston 112 of the pump control actuator 108 is held in a constant position due to the corresponding equal pressures of the fuels applied in the lines 116, 120. In this steady-state condition, the output windows 248, 252 of the pump control valve 208 are effectively disconnected from the corresponding input windows 240, 244. This is referred to as the null position of the input windows 240, 244. Leakage flow maintains appropriate pressures within the hydraulic lines 116, 120 to maintain the constant position of the piston 112 of the pump control actuator 108.

Still further, in this steady-state condition, the spool 212 of pump control valve 208 allows the relatively small amount (as compared to prior art bypass lines associated with fixed delivery pumps) of fuel to be bypassed from the pump outlet 128 through the bypass lines 188, 200, 220 back to the pump inlet 124.

Referring now to FIGS. 3 and 4, there illustrated are two examples of corresponding positions of the spool 212 of the pump control valve 208 during two different transient conditions. FIG. 3 illustrates a condition where the pump displacement is increasing. This condition may occur either upon command for increased engine flow by the EEC 176 through the metering valve 136 position, or due to a decrease in pump and engine speed. Ultimately, however, this increasing transient condition is reflected in a changed, instead of a constant, pressure drop of the fuel across the metering window 132. This causes a linear movement of the spool 212 of the pump control valve 208 toward the left in FIG. 3 which moves the output windows 248, 252 and bypass window 204, off of their null positions. A smaller amount of fuel in the bypass line 200 now passes through the windows 204, 216 and into the hydraulic line 220 back to the pump inlet 124. Also, the movement of the spool 212 causes fine filtered fuel in the line 196 to be passed through windows 244, 248 and into hydraulic line 120 to the piston 112 of the pump control actuator 108. At the same time, fuel in hydraulic line 116 passes through window 252 into the hydraulic line 220. This causes an imbalance in the pressures across the piston 112, causing movement of the piston 112. This causes a change in displacement of the pump 104 in a direction to re-establish the constant pressure drop across the metering window 132.

Thus, it can be seen from the foregoing that the pump control valve 208 maintains a constant pressure drop across the metering valve 136 by simultaneously varying pump displacement and the amount of fuel bypassed back to the pump inlet 124. By holding metering valve pressure drop to a constant value, fuel flow scheduling is a function of the metering valve position. However, the configuration of the present invention has several significant improvements over prior art control systems for variable delivery pumps that do not utilize a bypass line. For example, the control system 100 of the present invention allows for faster response of the pump to transient conditions. It also allows for reduced sensitivity to pump servo friction. Further, the heat generated by the fuel in the bypass line 188, 200, 220 has been found to be only 4° F., as compared to as much as 150° F. in prior art bypass lines for fixed delivery pumps.

FIG. 4 illustrates a different type of transient condition; that of a decreasing pump displacement. This transient condition may occur either upon command for increased engine flow by the EEC 176, or due to decrease in pump and engine speed. In this decreasing transient condition, the pump control valve 208 senses the change in the pressure drop across the metering window 132 and moves the spool 212 toward the right in FIG. 4. This increases the amount of fuel bypassed back to the pump inlet 124 through window 204. It also causes fine filtered fuel in the line 196 to be passed through the windows 244, 252 into the hydraulic line 116 to the piston 112 of the pump control actuator 108. At the same time, fuel in the hydraulic line 120 passes through the window 248 and into the bypass line 168 back to the pump inlet 124. This causes movement of the piston 112 of the pump control actuator 108 in a direction to cause a decrease in pump displacement. This ultimately causes the pressure drop across the metering window to resume its constant value.

In the preferred embodiment of the present invention, the amount of fuel bypassed in the lines 188, 200, 220 back to the pump inlet 124 varies in a range of 1000–2000 pounds per hour. This variation in bypass flow is much smaller than the aforementioned variation in fuel provided at the pump outlet 128. For this reason, the wash filter 192 is provided in the bypass flow path 188, 200. To achieve effective washing of a screen of the wash filter 192, the filter wash flow must be within a predefined velocity range. Since, as described hereinbefore, the amount of fuel bypassed back to the pump inlet 124 in the control system 100 of the present invention varies only as a function of pump discharge pressure, the variation in bypass flow is in a ratio of approximately 2 to 1. On the other hand, if the wash filter 192 was located in the line directly out of the pump outlet 128, the wash filter instead would see a 175 to 1 variation in flow and flow velocity. This is an unacceptable wash velocity at most operating conditions.

Once the pump control valve 208 has altered the displacement of the pump 104 in a sufficient manner to restore a nominal value of bypass flow through the pump control valve 208, the constant pressure drop across the metering window 132 returns the spool 212 of the pump control valve to the steady-state condition illustrated in FIG. 2. Also, the piston 112 of the pump control actuator 108 also resumes a steady-state condition.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A control system for providing a controlled amount of fuel to an engine, comprising:
    a variable delivery pump having an inlet and an outlet, the pump being operable to provide fuel at various predetermined quantities at the pump outlet;
    a metering valve having a metering window with first and second sides, the first side connected with the pump outlet, the metering window having fuel from the pump outlet flow through the metering window thereby creating a pressure drop of the fuel across the metering window from the first side to the second side;
    a pump control valve having a spool, the fuel from the first side of the metering window being connected to the spool to move the spool in a first direction, the fuel from the second side of the metering window being connected to the spool to move the spool in a second direction, the pump control valve having a first input orifice through which fuel passes to a first output orifice, an amount of opening of the first input orifice being controlled by a position of the spool;
    a bypass line having a first end connected with the first side of the metering window and having a second end connected with the pump inlet, in between the first and second ends of the bypass line is connected the first input and output orifices of the pump control valve, during a steady-state condition the pump control valve is operable to allow a predetermined amount of fuel to flow from the first end of the bypass line through the first input orifice and through the pump control valve and out the first output orifice to the pump inlet such that a constant pressure drop value across the metering window is maintained, during a transient condition in which the pressure drop across the metering window is no longer at the constant value the pump control valve is operable to allow an amount of fuel to flow from the first end of the bypass line through the first input orifice and through the pump control valve and out the first output orifice to the pump inlet to thereby vary the amount of fuel provided at the pump outlet such that the pressure drop across the metering window tends towards a constant value; and
    wherein the pump control valve further comprises a second input orifice and a third input orifice and second and third output orifices, the second input orifice being connected with a hydraulic fluid of a first predetermined pressure, the third input orifice being connected with a hydraulic fluid of a second predetermined pressure, the control system further comprising a pump control actuator operable to control the displacement of the pump to thereby control the amount of fuel delivered by the pump at the pump outlet, the pump control actuator having a moveable element whose position is controlled by application to the moveable element of the hydraulic fluids from the second and third output orifices of the pump control valve, during a steady-state condition the pump control valve is operable to keep constant the position of the moveable element of the pump control actuator thereby keeping constant the amount of fuel provided by the pump at the pump outlet to thereby keep constant the pressure drop across the metering window, during a transient condition the pump control valve is operable to vary the position of the moveable element of the pump control actuator thereby varying the amount of fuel provided by the pump at the pump outlet.

2. The control system of claim 1, further comprising:
    control means for controlling a position of the metering valve in response to a control signal;
    sensing means for sensing the position of the metering valve and for providing a sensed signal indicative thereof; and
    signal processing means, responsive to the sensed signal for providing a desired signal indicative of a desired position of the metering valve, for comparing the sensed signal with the desired signal and for providing the control signal to the control means, the control signal being indicative of any difference between the sensed signal and the desired signal.

3. The control system of claim 2, wherein the control means comprises a torque motor and a pilot valve, the torque motor being responsive to the control signal for controlling the position of the pilot valve, the pilot valve position being operable to control application of hydraulic fluid of varying pressures to the metering valve to thereby control the position of the metering window.

4. The control system of claim 1, further comprising a wash filter disposed in the bypass line between the first end of the bypass line and the pump control valve, the wash filter being operable to filter the fuel in the bypass line.

5. The control system of claim 1, further comprising a regulator valve having an input connected to the first end of the bypass line, the regulator valve being operable to regulate the pressure of the fuel at the regulator valve input to a predetermined value and to provide fuel at the predetermined regulated pressure value at an output of the regulator valve to the metering valve to thereby control a position of the metering window.

6. The control system of claim 1, wherein the spool of the pump control valve is linearly moveable between a pair of end positions, and wherein the pump control valve further comprises a spring operable to bias the spool of the pump control valve to a predetermined position.

7. A control system for controlling an amount of fuel provided by a variable delivery pump at a pump outlet, the pump having an inlet and having an associated pump control actuator for varying the displacement of the pump to thereby vary the amount of fuel provided by the pump at the pump outlet, the control system comprising:

a metering valve having a variable area metering window with first and second ends, the first end of the metering window connected with the pump outlet, fuel from the pump outlet being operable to flow through the metering window thereby creating a fuel pressure drop across the metering window;

a pump control valve having a spool connected across the metering window, the fuel pressure drop across the metering window controlling the position of the spool of the pump control valve;

a bypass line having a first portion disposed between the first end of the metering window and a first input orifice of a pump control valve, the bypass line having a second portion disposed between a first output orifice of the pump control valve and the pump inlet, during a steady-state condition the pump control valve is operable to allow a predetermined amount of fuel to flow through the first portion of the bypass line through the first input orifice of the pump control valve and through the pump control valve and out of the first output orifice to the pump inlet such that a constant pressure drop value across the metering window is maintained, during a transient condition in which the pressure drop across the metering window is no longer at the constant value, the pump control valve is operable to allow an amount of fuel to flow through the first portion of the bypass line through the first input orifice and through the pump control valve out of the first output orifice and through the second portion of the bypass line on to the pump inlet to thereby vary the amount of fuel provided at the pump outlet such that the pressure drop across the metering window tends towards a constant value; and wherein the pump control valve further comprises a second input orifice and a third input orifice and second and third output orifices, the second input orifice being connected with a hydraulic fluid of a first predetermined pressure, the third input orifice being connected with a hydraulic fluid of a second predetermined pressure, the second and third output orifices of the pump control valve being connected with the pump control actuator for directing hydraulic fluid to the pump control actuator, during a steady-state condition the pump control valve is operable to keep constant the position of the pump control actuator thereby keeping constant the amount of fuel being provided by the pump at the pump outlet to thereby keep constant the pressure drop across the metering window, during a transient condition the pump control valve is operable to vary the position of the pump control actuator thereby varying the amount of fuel provided by the pump at the pump outlet.

8. The control system of claim 7, further comprising:

control means for controlling a position of the metering valve in response to a control signal;

sensing means for sensing the position of the metering valve and for providing a sensed signal indicative thereof; and signal processing means responsive to the sensed signal, for providing a desired signal indicative of a desired position of the metering valve, for comparing the sensed signal with the desired signal and for providing the control signal to the control means, the control signal being indicative of any difference between the sensed signal and the desired signal.

9. The control system of claim 8, wherein the control means comprises a torque motor and a pilot valve, the torque motor being responsive to the control signal for controlling a position of the pilot valve, the pilot valve position being operable to control the application of hydraulic fluid of varying pressures to the metering valve to thereby control the position of the metering window.

10. The control system of claim 7, further comprising a wash filter disposed in the first portion of the bypass line, the wash filter being operable to filter the fuel in the bypass line.

11. The control system of claim 7, further comprising a regulator valve having an input connected to the first portion of the bypass line, the regulator valve being operable to regulate the pressure of the fuel at the regulator valve input to a predetermined value and to provide fuel at predetermined regulated pressure value at an output of the regulator valve to the metering valve to thereby control a position of the metering window.

12. The control system of claim 7, wherein the spool of the pump control valve is linearly moveable between a pair of end positions, and wherein the pump control valve further comprises a spring operable to bias the spool of the pump control valve to a predetermined position.

* * * * *